(12) United States Patent
Gorday et al.

(10) Patent No.: US 6,594,317 B2
(45) Date of Patent: Jul. 15, 2003

(54) SIMPLE ENCODING/DECODING TECHNIQUE FOR CODE POSITION MODULATION

(75) Inventors: Paul E. Gorday, West Palm Beach, FL (US); Edgar H. Callaway, Jr., Boca Raton, FL (US); Neiyer S. Correal, Cooper City, FL (US)

(73) Assignee: Motorola, Inc, Schaumburg, IL (US)

( * ) Notice: Subject to any disclaimer, the term of this patent is extended or adjusted under 35 U.S.C. 154(b) by 0 days.

(21) Appl. No.: 10/029,038

(22) Filed: Apr. 8, 2002

(65) Prior Publication Data

US 2003/0035489 A1 Feb. 20, 2003

Related U.S. Application Data

(60) Provisional application No. 60/308,414, filed on Jul. 27, 2001.

(51) Int. Cl.[7] .............................................. H04L 27/00
(52) U.S. Cl. ...................................................... 375/259
(58) Field of Search ................................. 375/259, 239, 375/260, 222, 223, 295, 309, 130; 370/205; 332/112

(56) References Cited

U.S. PATENT DOCUMENTS 5,909,462 A * 6/1999 Kamerman et al. ......... 375/147
6,115,411 A * 9/2000 van Driest .................. 375/130

* cited by examiner

Primary Examiner—Khai Tran
(74) Attorney, Agent, or Firm—Andrew S. Fuller; Barbara R. Doutre (57) ABSTRACT

A method and apparatus for encoding and decoding signals using code position modulation (CPM) in a communication system. The encoding method includes storing an N-chip pseudo-random noise sequence, such as an m-sequence, in a circular shift register and circularly shifting it to obtain a shifted m-sequence. The shifted m-sequence is compared to an m-bit symbol corresponding to the k bit information value. If the shifted m-sequence and the m-symbol match, the shifted m-sequence is output as the N-chip CPM sequence. Alternatively, the m-symbol is used as an initial condition for a pseudo-noise sequence generator. The corresponding decoder stores an N-chip m-sequence in a circular shift register and a correlates shifted version of the m-sequence with a received N-chip CPM sequence. When a peak in the correlation value is detected, an m-bit field is retrieved from the circular shift register and mapped back to a k-bit information value.

39 Claims, 10 Drawing Sheets

(PRIOR ART)

*FIG. 1*

(PRIOR ART)

SIMPLE ENCODING/DECODING TECHNIQUE FOR CODE POSITION MODULATION

CROSS REFERENCE TO RELATED DOCUMENTS

This application claims the benefit of U.S. provisional application No. 60/308,414 for "Simple Encoding/Decoding Technique For Code Position Modulation", filed Jul. 27, 2001. This application is hereby incorporated by reference.

TECHNICAL FIELD

This invention relates to techniques and apparatus for efficient encoding and decoding of communication signals, and in particular to techniques and apparatus for encoding and decoding using code position modulation for use in wireless personal area networks.

BACKGROUND OF THE INVENTION

Code Position Modulation (CPM) has recently been selected as the modulation format for the IEEE 802.15.4 standard for low-rate wireless personal area networks (WPAN's). Size, cost, and power consumption are critical parameters for devices within this standard. Consequently, there is a continuing need for simplified encoding/decoding techniques that result in more efficient data transfer across the network.

In code position modulation (CPM), each transmitted symbol is represented by a N-chip pseudo-noise (PN) sequence. k bits of information can be encoded into each symbol by circularly shifting the N-chip sequence to one of $2^k$ positions (where $2^k$ is less than or equal to N).

In the IEEE 802.15.4 standard, the type of PN sequence used to represent each symbol is a "maximal-length linear feedback shift register sequence" or "m-sequence". m-sequences have good auto-correlation properties, making it easy to distinguish phase shifts (different code positions) of the sequence, and they have reasonably good cross-correlation properties.

Prior methods for generating the circularly shifted symbol include the use of a look-up table that contains the N-chip sequences for each of the $2^k$ required shifts. This requires a large amount of memory for large values of k. An alternative uses a circular shift register and a down-counter. The down-counter is loaded with the shift value, and the shift register is shifted once for each count of the down-counter. When the counter reaches zero, the shift register contains the required symbol.

However, memory and down-counters add cost and complexity to the encoder (and to the corresponding decoder). Consequently, there is a need for a simpler, less expensive technique and apparatus for generating CPM symbols.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present invention is a new technique and apparatus for implementing code position modulation (CPM). The technique simplifies the encoding/decoding process and results in a reduction of circuit complexity compared to prior approaches.

In CPM, each transmitted symbol is represented by an N-chip pseudo-noise (PN) sequence. k bits of information can be encoded into each symbol by circularly shifting the N-chip sequence to one of $2^k$ positions (where $2^k$ is less than or equal to N).

Figure 1:
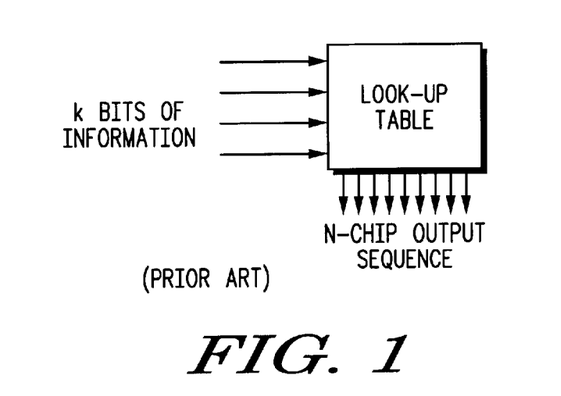
FIG. 1 is a block diagram of a CPM encoder of the prior art using a look-up-table.

FIG. 1 shows a known implementation for converting a k-bit information value into an N-chip modulation symbol. A simple look-up table is used, where k information bits are used to address of $2^k$ memory locations. Each memory location contains a shifted version of the N-chip sequence, which can be output serially or in parallel (as shown). While this method is simple, it has a high memory requirement for large k.

Figure 2:
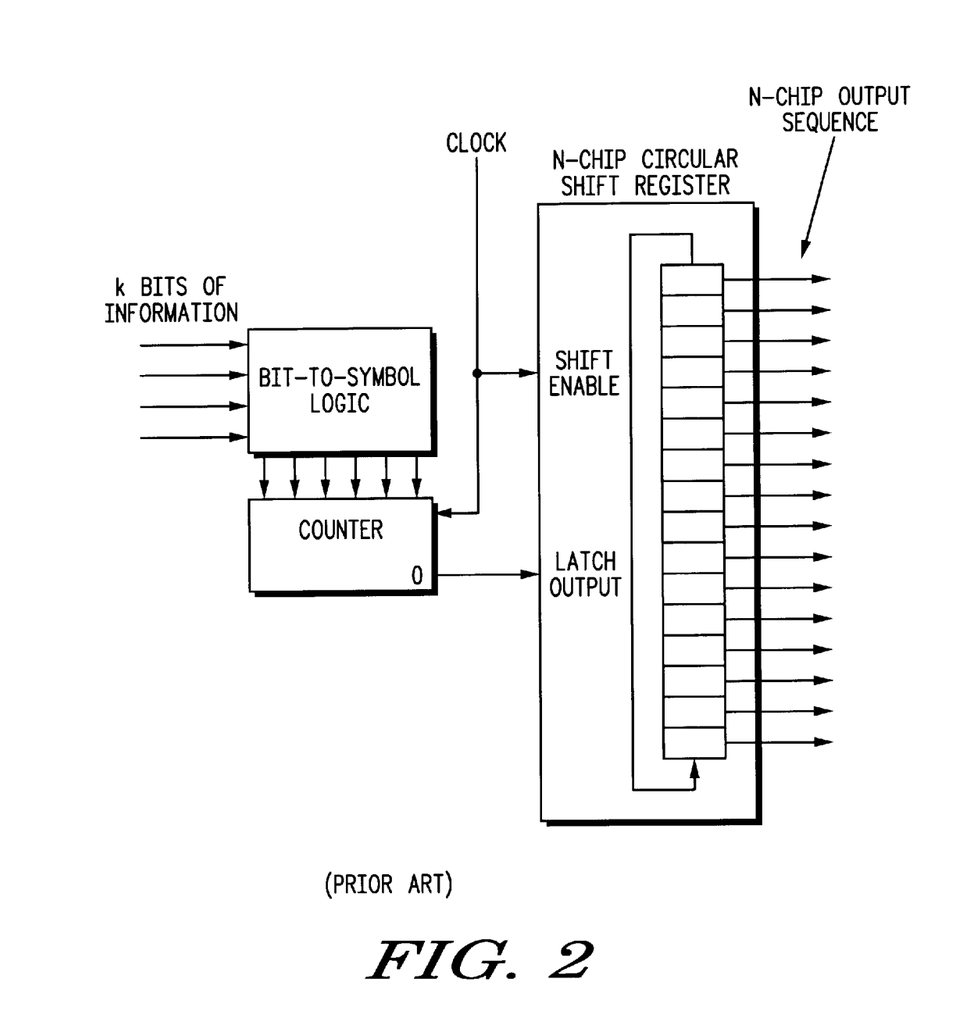
FIG. 2 is a block diagram of a CPM encoder of the prior art using a shift register and down-counter.

FIG. 2 shows a further known implementation for converting a k-bit information value into an N-chip modulation symbol. This implementation requires less memory. In this implementation, the k information bits are first converted to a shift value. The N-chip PN sequence is stored in a circular shift register. The down-counter is loaded with the shift value, and the shift register is shifted once for each count of the down-counter. When the counter reaches zero, the shift register contains the required symbol. The k information bits may be converted to a shift value using a look-up table or, as shown in the figure, using combinational logic.

Figure 3:
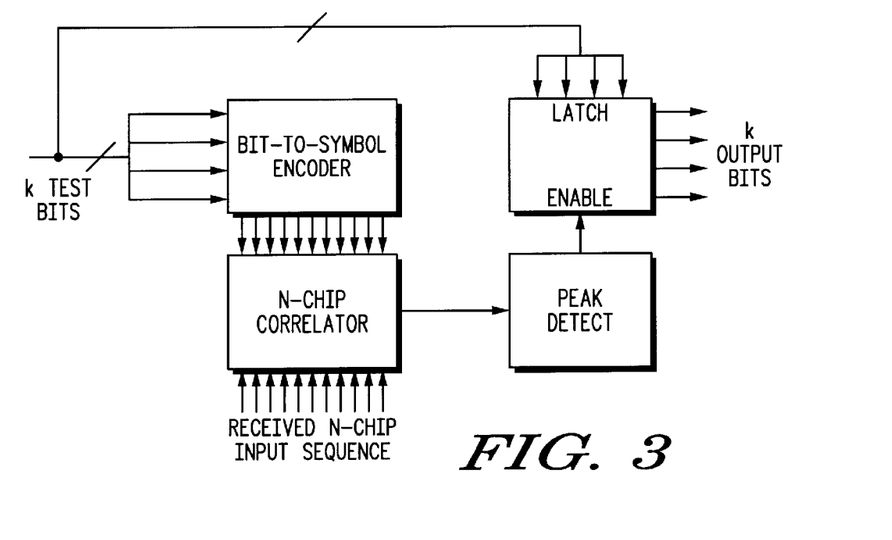
FIG. 3 is a block diagram of a CPM decoder of the prior art.

A corresponding demodulator is shown in FIG. 3. A group of k test bits are generated and passed to a bit-to-symbol encoder that produces a corresponding N-chip test sequence. The bit-to-symbol encoder can be either of those described above with reference to FIGS. 2 and 3. The N-chip test sequence is correlated with the received N-chip input sequence and the result is passed to peak detection circuit. The procedure for finding the k bits output bits may be to try all $2^k$ possible test bit patterns and select the one that produces the largest correlation value, or to select the first test pattern for which the correlation value exceeds a given threshold.

One aspect of the present invention is a simplified bit-to-symbol encoder that may be implemented with simpler circuitry than the methods described above. The invention utilizes the properties of a "maximal-length linear feedback shift register sequence" or "m-sequence". An m-sequence has length $N=2^m-1$, where m is an integer. However, an m-sequence may also be augmented by including an additional chip, whose value may be one or zero, such that the sequence has length $N=2^m$. In the non-augmented case, one of the known properties of an m-sequence is that if a window of width m is moved along the m-sequence, each m-tuple except the all zero m-tuple will appear exactly once. This is described in "Digital Communications and Spread Spectrum Systems", R. E. Zimmer and R. L. Peterson, Macmillan Publishing Company, New York, 1985. In the augmented case, if an additional zero is properly positioned, then the augmented sequence will have the same property and will further include the all-zero m-tuple.

With respect to CPM modulation, keeping the window fixed and circularly shifting the sequence is equivalent to sliding an m-length window along a fixed sequence, and all possible m-tuples will appear exactly once (except the all-zero m-tuple if the sequence is not augmented). Thus, there is a unique mapping from all m-tuples appearing in the m-chip window to the $2^m-1$ (or $2^m$ if the sequence is augmented with a zero) shift values that define the set of valid CPM symbols.

Figure 4:
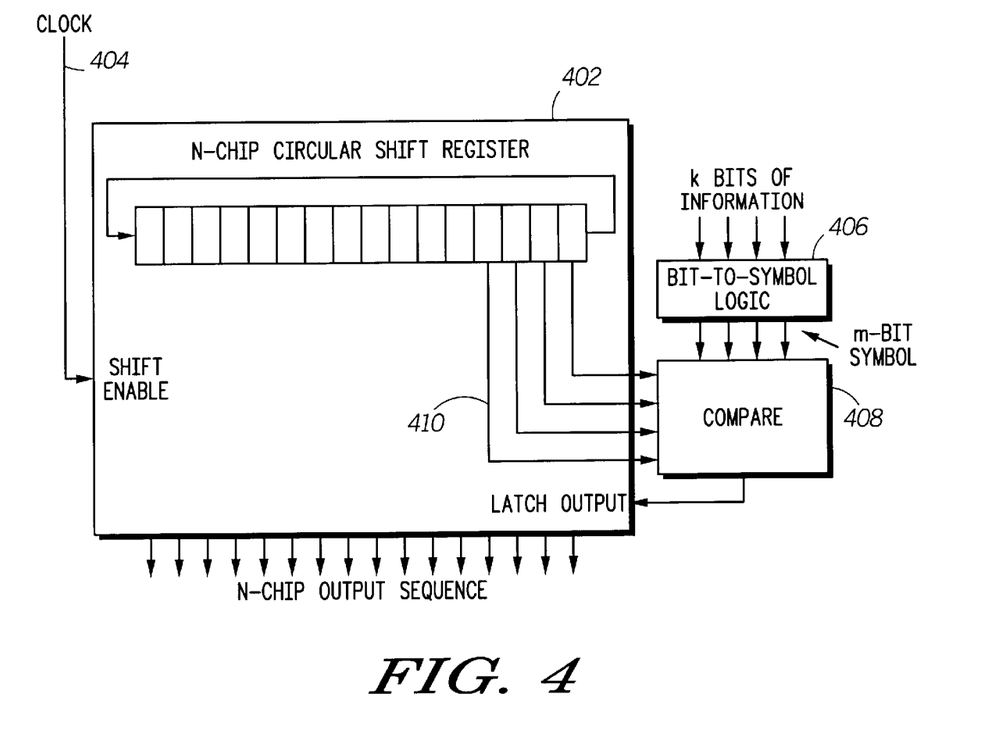
FIG. 4 is a block diagram of a CPM encoder in accordance with an embodiment of the present invention.

One embodiment of the present invention that makes use of this property is shown in FIG. 4. Referring to FIG. 4, an m-sequence is stored in an N-chip circular shift register 402. The shift register is enabled by clock signal 404 and performs circular shifts of the m-sequence. The k bits of information to be encoded are passed to combinational logic circuitry 406 where they are mapped to an m-bit symbol value. In each clock cycle, m-bits 410 of the circular shift register 402 are passed to comparator 408, where they are compared to the m-bit symbol. If a match is found between the m-bits 410 of the circular shift register and the m-bit symbol, the contents of the shift register are output as the N-chip output symbol. Compared to previous methods, the technique uses a similar amount of combinational logic for bit-symbol matching, but the down-counter s replaced by a simple comparator.

Figure 5:
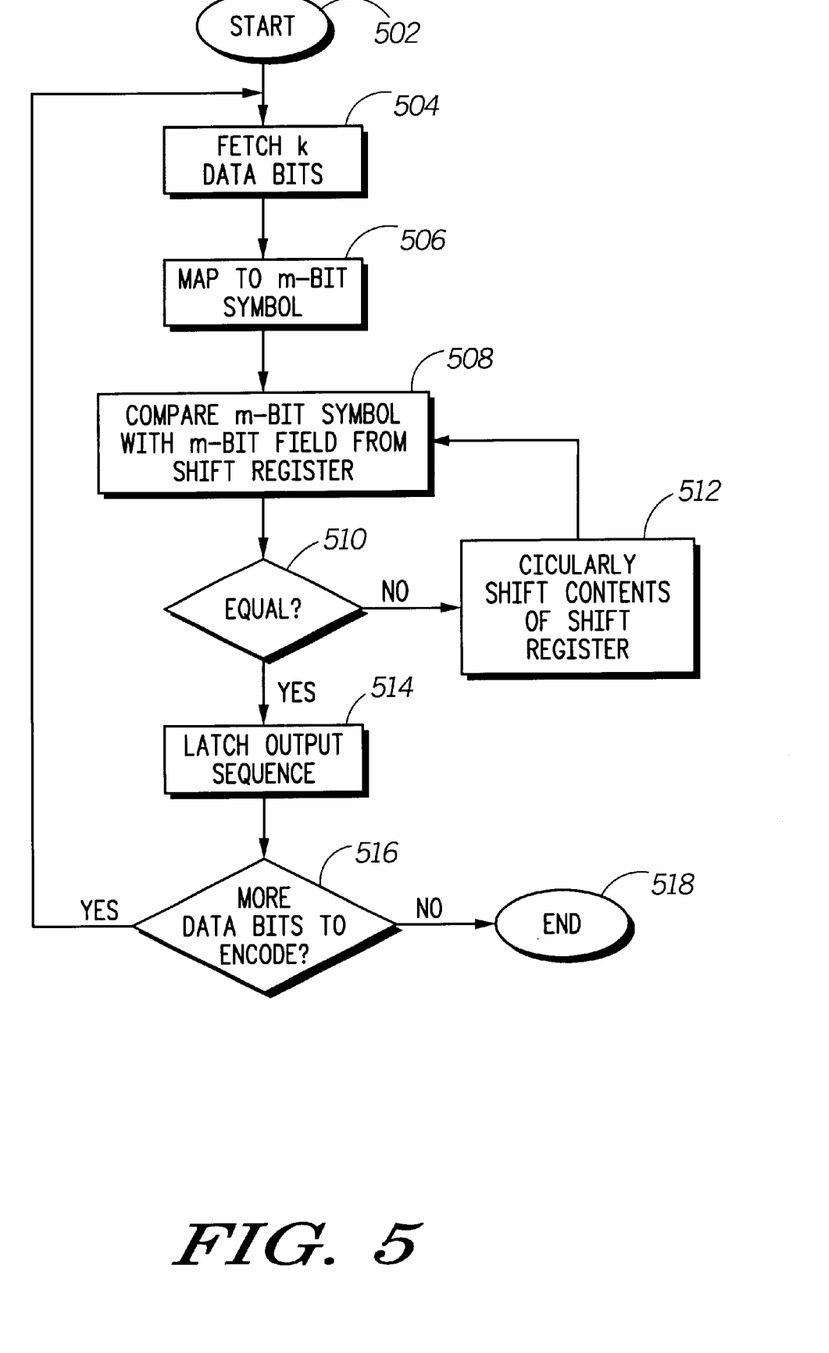
FIG. 5 is a flow chart of a method for CPM encoding in accordance with an embodiment of the present invention.

FIG. 5 shows a flow chart of the method for this embodiment. Following start block 502, k-bits of data are fetched at block 504. At block 506, the k-bits of data are mapped to an m-bit symbol (m-tuple), using combinational logic or a look-up table for example. At block 508, the m-bit symbol is compared to an m-bit field selected from the shift register. Preferably, m-contiguous bits are selected, but other groups of bits may be used. For example, a uniformly spaced set of bits may be used. If non-uniformly spaced bits are used, additional circuitry may be required if some m-tuples appear more than once. If the m-bit symbol and the m-bit field selected from the shift register are not equal, as depicted by the negative branch from decision block 510, the contents of the circular shift register are shifted at block 512 and the m-bit symbol is again compared to an m-bit field selected from the shift register at block 508. If the m-bit symbol and the m-bit field selected from the shift register are equal, as depicted by the positive branch from decision block 510, the contents of the shift register is latched to the output at block 514. At decision block 516 a check is made to determine if more data bits are to be encoded. If not, as depicted by the negative branch from decision block 516, the process ends at block 518. Otherwise, as depicted by the positive branch from decision block 516, the process returns to block 504 and the next k data bits are retrieved.

Figure 6:
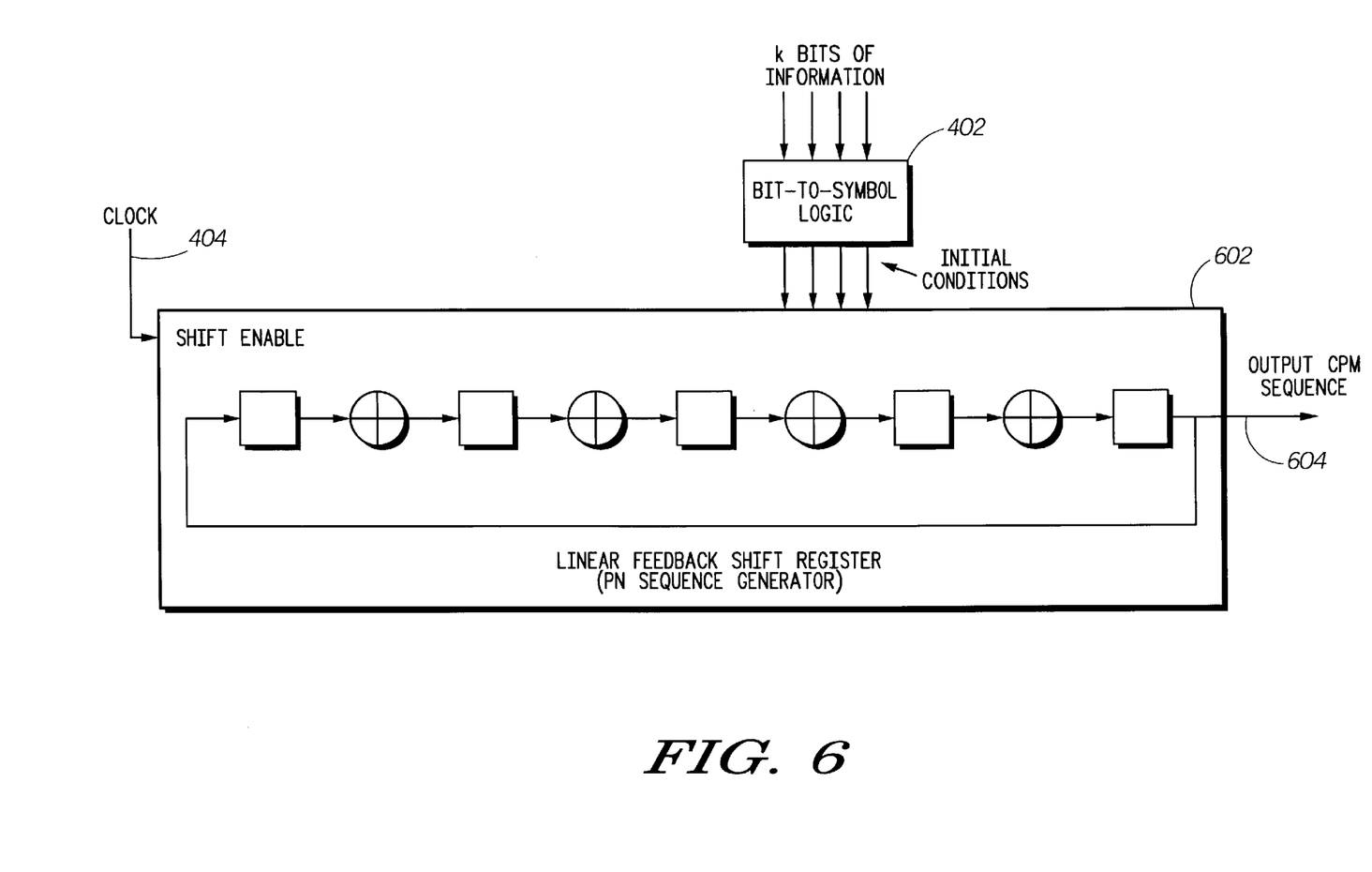
FIG. 6 is a block diagram of a CPM encoder in accordance with a further embodiment of the present invention.

An alternative embodiment of an encoder of the invention is shown in FIG. 6. When a non-augmented m-sequence is used, the sequence may be generated as needed, rather than being stored in a shift register. This further reduces the amount of circuitry required. Referring to FIG. 6, an m-bit symbol value is obtained from the k-bit data value using bit-to-symbol logic 402 as before, but in this embodiment, the m-bit symbol is loaded as an initial condition into a PN sequence generator 602. In the figure, the PN sequence generator 602 comprises a linear feedback shift register that is triggered by clock signal 404. In this case the comparator is eliminated and the length $(2^m-1)$ circular shift register is replaced by a length m linear feedback shift register. If an augmented m-sequence with length $2^m$ is desired, additional circuitry may be used to insert an additional chip at a desired position in the output CPM sequence. The k-bits of information may be used to determine the insertion point.

Figure 7:
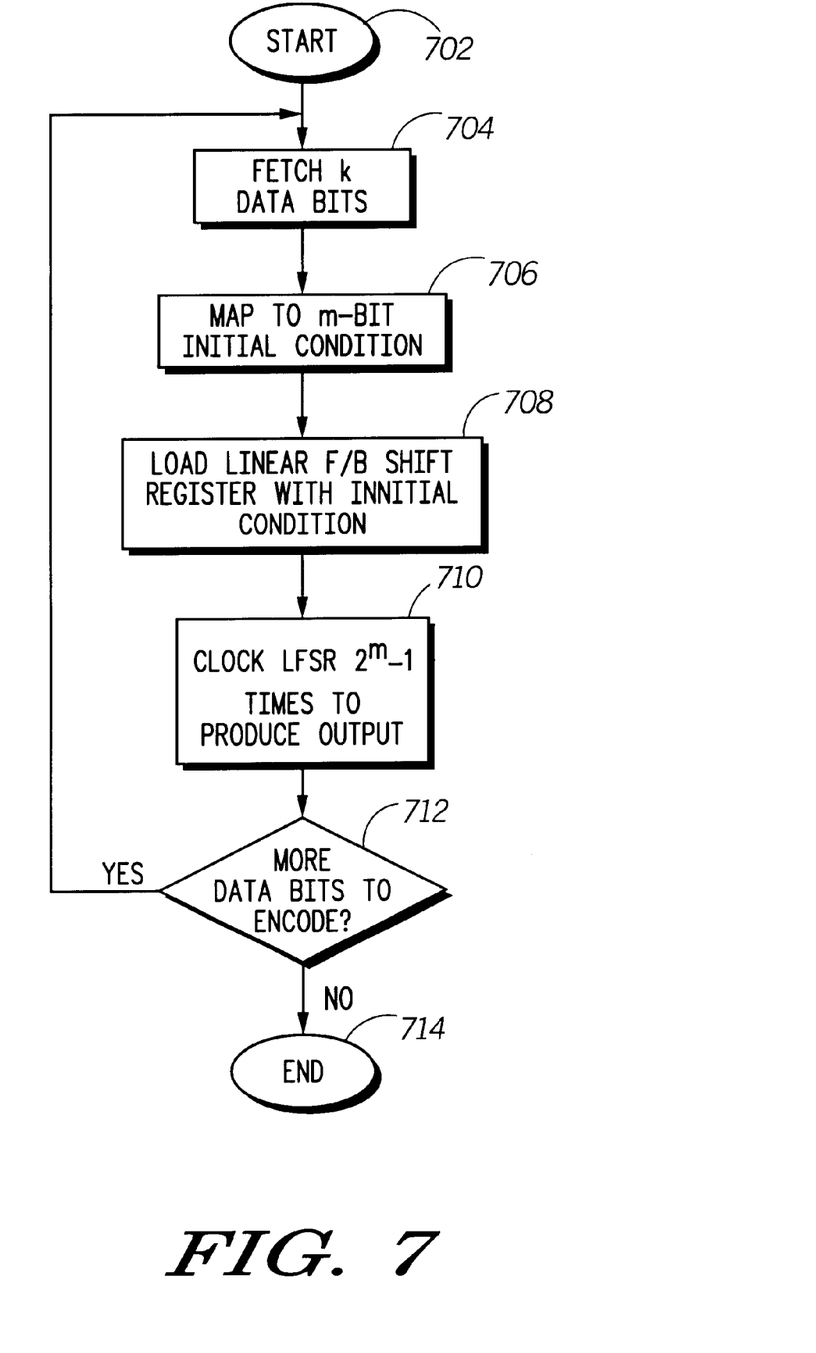
FIG. 7 is a flow chart of a method for CPM encoding in accordance with a further embodiment of the present invention.

FIG. 7 shows a flow chart of the method for this embodiment. Following start block 702, k-bits of data are fetched at block 704. At block 706, the k-bits of data are mapped to an m-bit symbol (m-tuple), using combinational logic or a look-up table for example. At block 708, the m-bit symbol is loaded as an initial condition into a linear feedback shift register (LFSR). The LFSR is then clocked $N=2^m-1$ times at block 710 to produce the N-chip output sequence. At decision block 712 a check is made to determine if more data bits are to be encoded. If not, as depicted by the negative branch from decision block 712, the process ends at block 714. Otherwise, as depicted by the positive branch from decision block 712, the process returns to block 704 and the next k data bits are retrieved.

Figure 8:
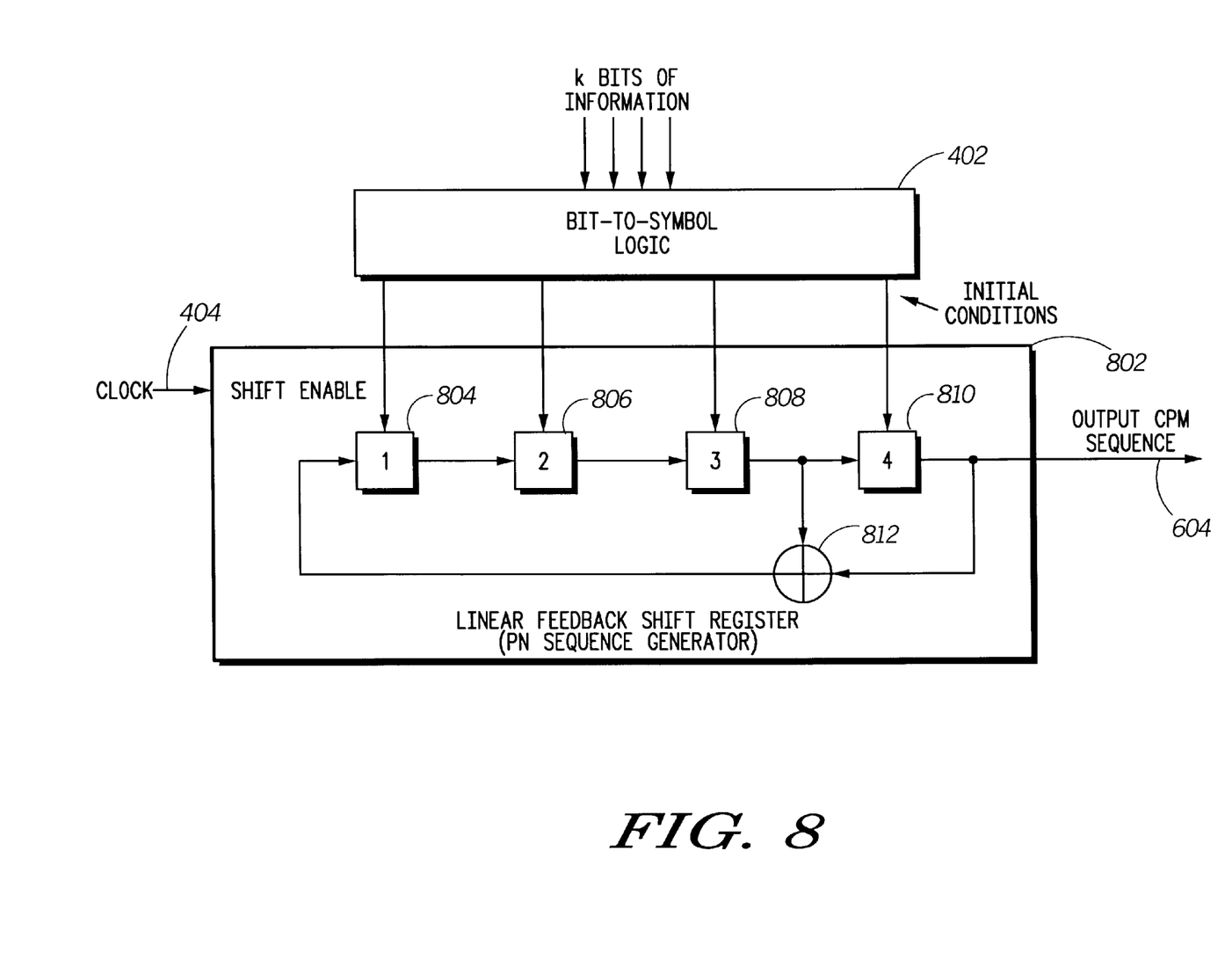
FIG. 8 is a block diagram of a exemplary CPM encoder in accordance with a further embodiment of the present invention.

FIG. 8 shows an example of an encoder for m=4. In this example the LFSR has 4 memory locations, 804, 806, 808 and 810, and a single, modulo 2 adder, 812. A k-bit information value is load into bit-to-symbol logic 402, that produces a 4-bit initial condition. Each bit is loaded into one of the four memory locations in the LFSR, and the LFSR is then clocked $2^m-1=15$ times to produce the output sequence 604.

An example PN code sequence for m=4, which has length $N=2^m-1=15$, produced by the initial condition (1, 0, 0, 0) (a one is loaded into memory 804, zeros are loaded into memories 806, 808 and 810) is $C_{15}$=(0, 0, 0, 1, 0, 0, 1, 1, 0, 1, 0, 1, 1, 1, 1).

This can be augmented by adding a zero to give the length 16 sequence $C_{16}$=(0, 0, 0, 1, 0, 0, 1, 1, 0, 1, 0, 1, 1, 1, 1, 0).

Table 1 shows an exemplary mapping between the symbols 1–15 and the 4-tuples in the code $C_{15}$.

TABLE 1

| k-bit Data | m-tuple | | | |
|---|---|---|---|---|
| S | 4 | 3 | 2 | 1 |
| 1 | 0 | 0 | 0 | 1 |
| 2 | 0 | 0 | 1 | 0 |
| 3 | 0 | 1 | 0 | 0 |
| 4 | 1 | 0 | 0 | 1 |
| 5 | 0 | 0 | 1 | 1 |
| 6 | 0 | 1 | 1 | 0 |
| 7 | 1 | 1 | 0 | 1 |
| 8 | 1 | 0 | 1 | 0 |
| 9 | 0 | 1 | 0 | 1 |
| 10 | 1 | 0 | 1 | 1 |
| 11 | 0 | 1 | 1 | 1 |
| 12 | 1 | 1 | 1 | 1 |
| 13 | 1 | 1 | 1 | 0 |
| 14 | 1 | 1 | 0 | 0 |
| 15 | 1 | 0 | 0 | 0 |

It can be seen that each code corresponds to a unique 4-tuple and each 4-tuple corresponds to a unique symbol. It should be noted that in many practical applications, such as described in IEEE 802.15.4, much longer code sequences are used and the mapping from k-bit data values to shift (and hence m-bit symbols) is prescribed by the specification so as to allow inter-operability of devices.

A pseudo-code listing of an exemplary code generator for a symbol S is given below.

% map data symbol S to initial condition IC=m_tuple(S, 1:m);
% initialize shift register x(1:m)=IC;
% clock PN generator N times for k=1:N
    output(k)=x(m); % generate $k^{th}$ output element
    fb=x(m)⊕x(m−1); % get feedback, modulo 2 add
    x(2:m)=x(1:m−1); % update shift register
    x(1)=fb; % update shift register
end;

In this example, the generator is initialized by storing the m-tuple, corresponding to the desired symbol, in the shift-register delay line.

In non-standard applications, the designer may be free to select the mapping between input bit fields and the corresponding shift in the PN code sequence. In this case, a simplified mapping may be used, in which the k data bits plus a 'one' are used as initial conditions to a length k+1 PN generator, generating a length $2^{k+1}-1$ PN code sequence. For example, when k=4 and m=5, the mapping in Table 2 may be used.

TABLE 2

| k-bit Data | initial condition | | | | |
|---|---|---|---|---|---|
| S | 1 | 2 | 3 | 4 | 5 |
| 0000 | 1 | 0 | 0 | 0 | 0 |
| 0001 | 1 | 0 | 0 | 0 | 1 |
| 0010 | 1 | 0 | 0 | 1 | 0 |
| 0011 | 1 | 0 | 0 | 1 | 1 |
| 0100 | 1 | 0 | 1 | 0 | 0 |
| 0101 | 1 | 0 | 1 | 0 | 1 |
| 0110 | 1 | 0 | 1 | 1 | 0 |
| 0111 | 1 | 0 | 1 | 1 | 1 |
| 1000 | 1 | 1 | 0 | 0 | 0 |
| 1001 | 1 | 1 | 0 | 0 | 1 |
| 1010 | 1 | 1 | 0 | 1 | 0 |
| 1011 | 1 | 1 | 0 | 1 | 1 |
| 1100 | 1 | 1 | 1 | 0 | 0 |

TABLE 2-continued

| k-bit Data | initial condition | | | | |
|---|---|---|---|---|---|
| S | 1 | 2 | 3 | 4 | 5 |
| 1101 | 1 | 1 | 1 | 0 | 1 |
| 1110 | 1 | 1 | 1 | 1 | 0 |
| 1111 | 1 | 1 | 1 | 1 | 1 |

In this embodiment, the combinational logic circuit is not required in the encoder. In addition, the combinational logic circuit is not required in the decoder, since the k rightmost bits of the matching PN code are equal to the kdata bits. This further simplifies the circuitry of the encoder and the decoder.

Figure 9:
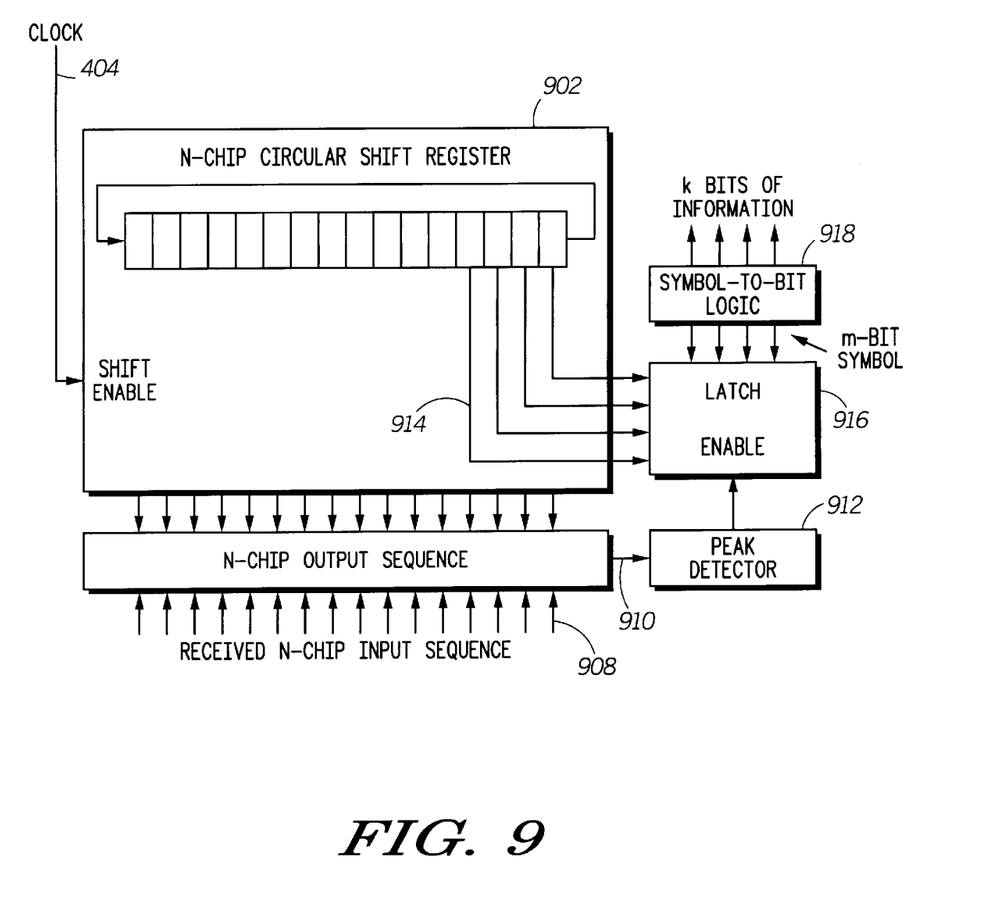
FIG. 9 is a block diagram of a CPM decoder in accordance with an embodiment of the present invention.

A decoder of the present invention is shown in FIG. 9. The PN code sequence is stored in a circular shift register 902 that is clocked by clock signal 904. The contents of the shift register are shifted to each of the valid shift positions in turn. At each shift position, the contents 906 of the shift register are correlated with the received N-chip input sequence 908. The resulting correlation value 910 is passed to a peak detector 912. When the peak correlation is detected (either the highest correlation value, the first correlation value above a given threshold, or some other desired correlation criteria), m-bits 914 of the shift register are output as the detected m-bit symbol using latch 916. The detected symbol is input to a symbol-to-bit logic circuit 918 (combinational logic or a look-up table, for example) to determine the corresponding k-bits of information. Note that the symbol-to-bit logic circuit requires only $2^k$ input-output mappings, even though m bits are used as inputs. This is because, in general, some of the $2^m$ possible symbols (code positions) are not used.

Figure 10:
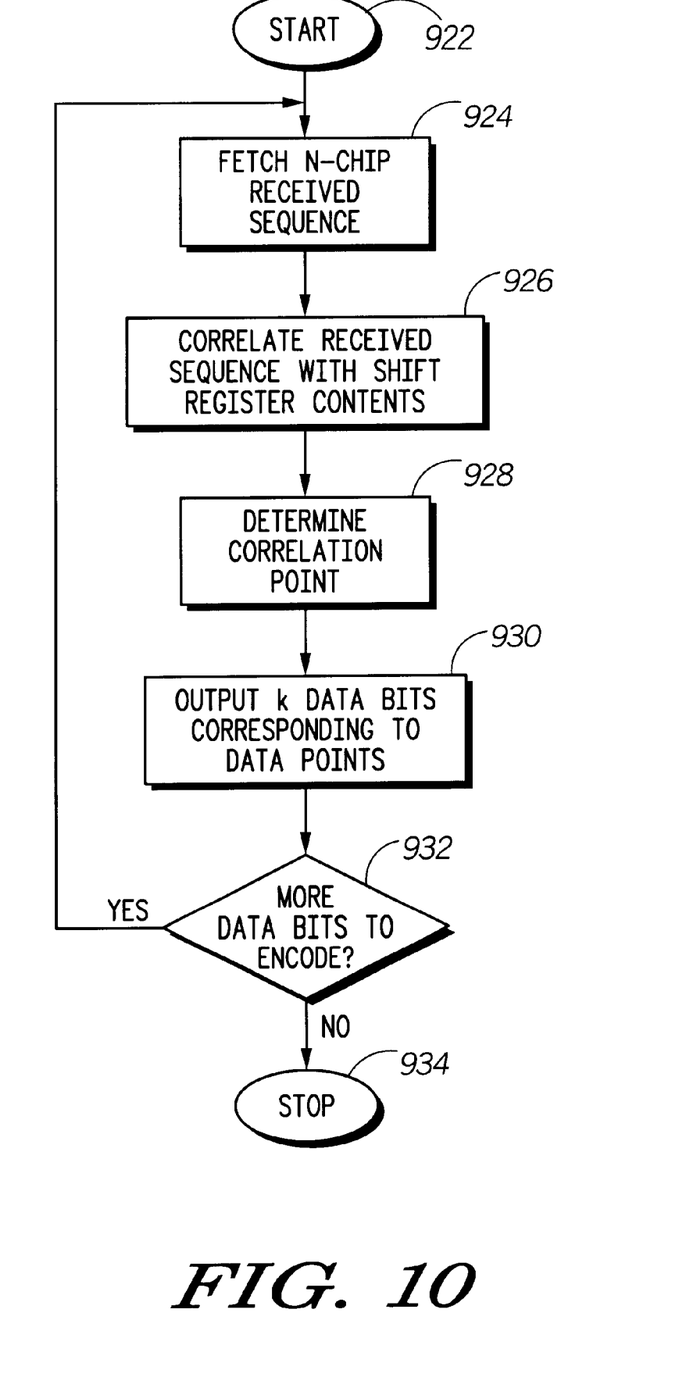
FIG. 10 is a flow chart of a method for CPM decoding in accordance with an embodiment of the present invention.

A flow chart depicting the decoding method is shown in FIG. 10. Following start block 922, the N-chip received sequence is fetched at block 924. At block 926, the received sequence is correlated with the contents of the shift register for each of a number of shifts. At block 928, the correlation point is determined, by determining the shift for which the correlation is maximized, or by finding the first shift for which the correlation exceeds a given threshold. This shift is called the correlation point. This is described in more detail later. At block 930, the k data bits corresponding to the correlation point are output. At decision block 932 a check is made to determine if more data bits are to be encoded. If not, as depicted by the negative branch from decision block 932, the process ends at block 934. Otherwise, as depicted by the positive branch from decision block 932, the process returns to block 924 and the next N-chip received sequence is fetched.

Figure 11:
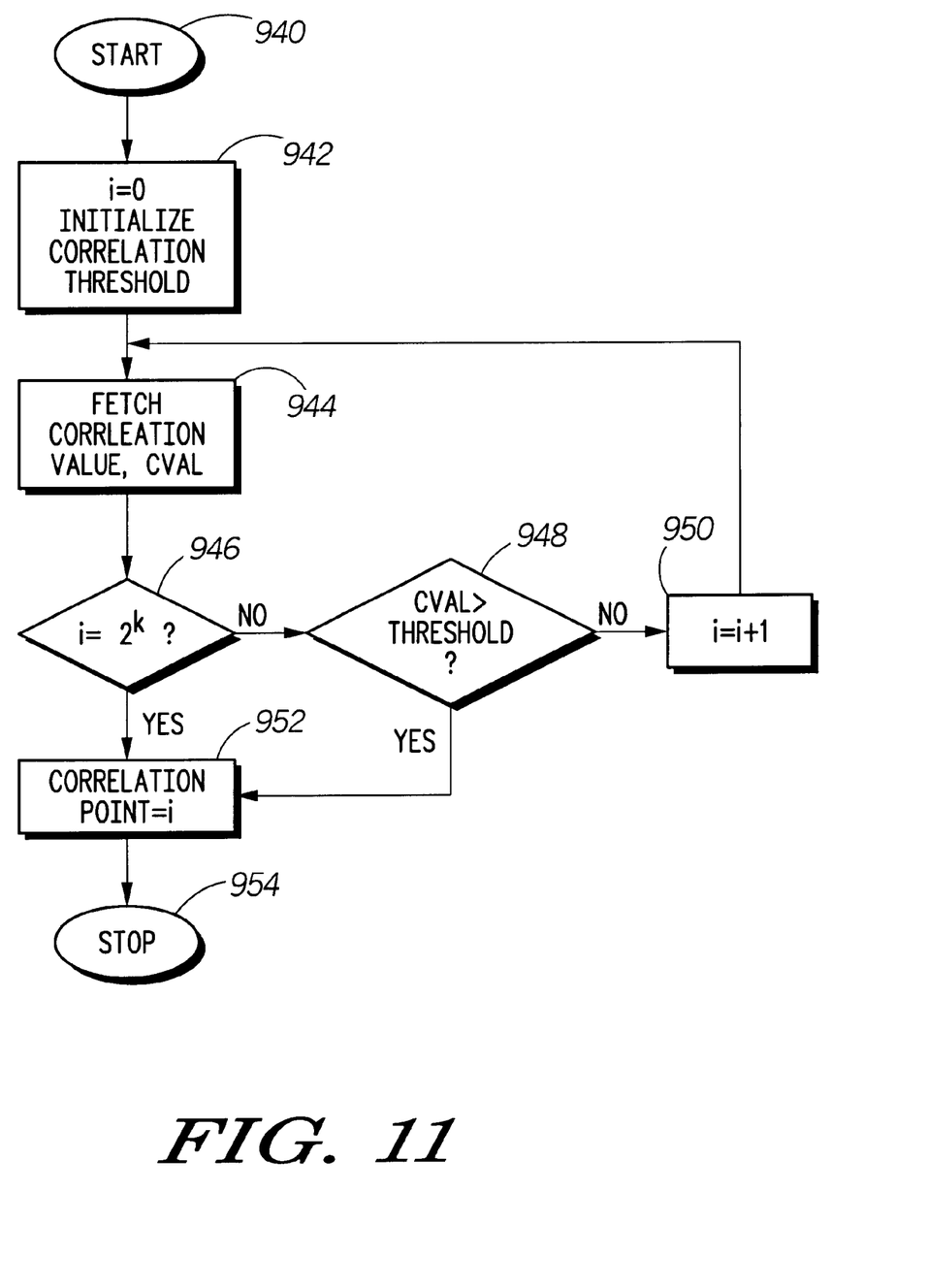
FIG. 11 is a flow chart of a method for determining a correlation peak for use in CPM decoding in accordance with an embodiment of the present invention.

FIG. 11 is a flow chart depicting one embodiment of the method for determining the correlation point. Following start block 940, a counter i, corresponding to a shift value, is initialized to zero, and a correlation threshold is initialized to a threshold value at block 942. At block 944 the next the correlation value CVAL is retrieved from the correlator. At block 946 a check is made to determine if all $2^k$ shifts have been checked. If not, as denoted by the negative branch from decision block 946, a check if made at decision block 948 to determine if the correlation value CVAL is greater than the threshold value. If CVAL does not exceed the threshold value, as depicted by the negative branch from decision block 948, the counter is incremented at block 950. Flow then returns to block 944, and the next CVAL is retrieved. If the correlation value CVAL exceeds the threshold value, as depicted by the positive branch from decision block 948, the correlation point is determined at block 952 to occur at shift i and to have a value CVAL. The process terminates at block 954. In this embodiment, the shift is determined as the first shift for which the correlation value exceeds the threshold. If all $2^k$ shifts have been checked in block 946 with none of the correlation values exceeding the threshold, then the process goes to block 952 where the correlation point is set to i=$2^k$. In a preferred embodiment, a correlation point of i=$2^k$ would be interpreted as a decoding error and treated appropriately (marked as an erasure, set to zero, etc.). The process then terminates in block 954.

Figure 12:
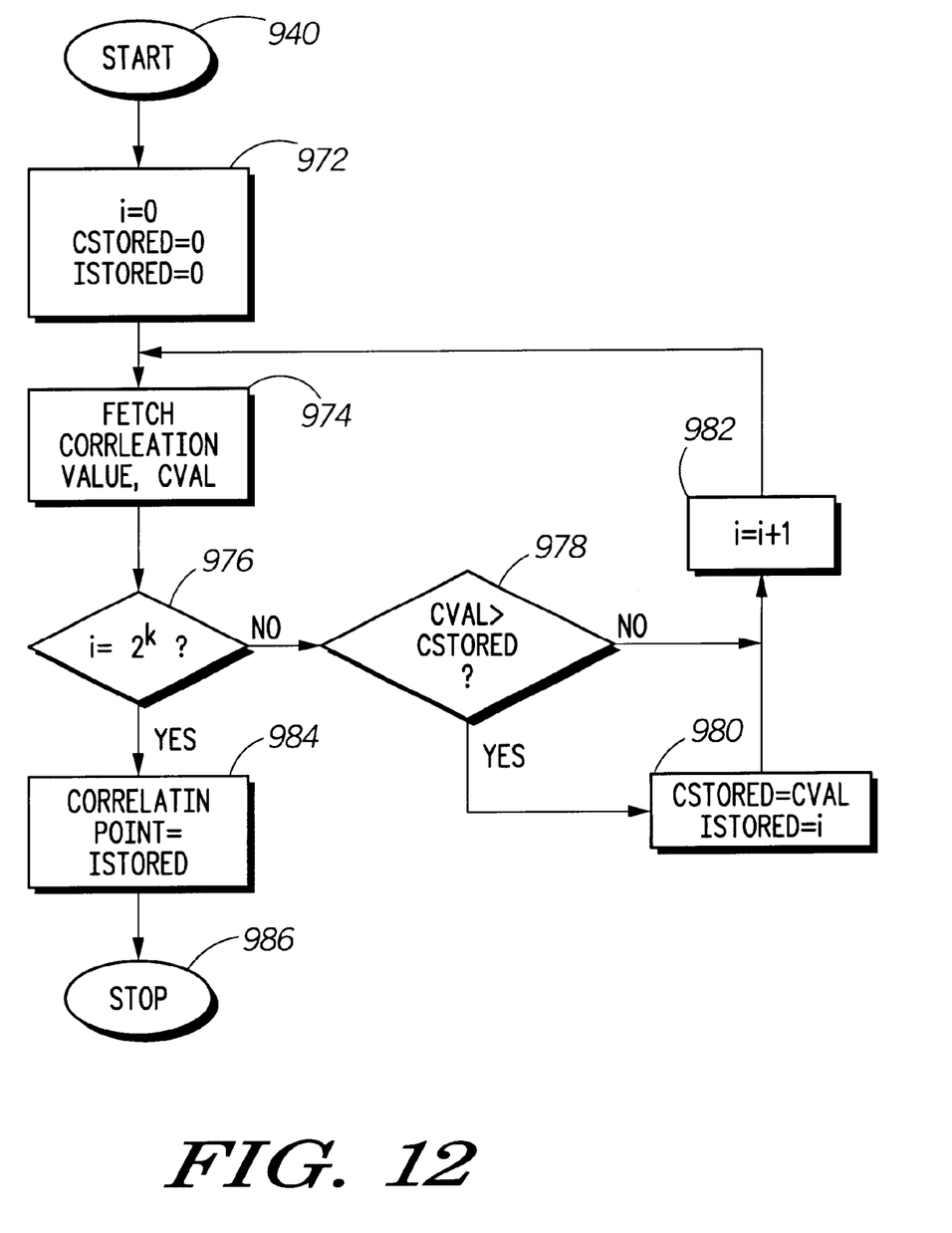
FIG. 12 is a flow chart of a further method for determining a correlation peak for use in CPM decoding in accordance with an embodiment of the present invention.

FIG. 12 is a flow chart depicting a further embodiment of the method for determining the correlation point. Following start block 970, a counter i is initialized to zero, a stored correlation value CSTORED is initialized to zero, and a stored counter value ISTORED is initialized to zero at block 972. At block 974, the next correlation value CVAL is retrieved from the correlator. At block 976, a check is made to determine if all $2^k$ shifts have been checked. If not, as denoted by the negative branch from decision block 976, a check is made at decision block 978 to determine if the correlation value CVAL is greater than the stored correlation value CSTORED. If so, as depicted by the positive branch from decision block 978, the stored correlation value, CSTORED is set to the value CVAL at block 980, and ISTORED is set to the current value of the counter i. If the correlation value CVAL is less than the stored correlation value CSTORED, or if CSTORED has been updated at block 980, flow continues to block 982, where the counter i is incremented. Flow then returns to block 974 and the next correlation value CVAL is retrieved. Once all possible shifts have been checked, as denoted by the positive branch from decision block 976, the correlation point is determined to be ISTORED at block 984. The process terminates at block 986.

Those of ordinary skill in the art will recognize that the present invention has been described in terms of exemplary embodiments based upon use as special purpose hardware. However, the invention should not be so limited, since the present invention could be implemented using hardware component equivalents such and/or dedicated processors, which are equivalents to the invention as described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for generating an N-chip modulation sequence corresponding to a k bit information value in a Code Position Modulation encoder, said method comprising:

mapping said k bit information value to an m-bit symbol;

storing an N-chip m-sequence in a circular shift register, wherein said N-chip m-sequence has length N=$2^m-1$, where m is an integer;

circularly shifting said N-chip m-sequence to obtain a shifted m-sequence;

comparing an m-bit field from said shifted m-sequence with said m-bit symbol; and outputting said shifted m-sequence as said N-chip modulation sequence if said m-bit field matches said m-bit symbol.

2. A method as in claim 1, wherein said mapping comprises processing said k-bit information value in a combinational logic circuit.

3. A method as in claim 1, wherein said mapping comprises accessing a look-up table in accordance with said k-bit information value.

4. A method as in claim 1, further comprising augmenting said m-sequence by including an additional chip such that the sequence length is N=$2^m$.

5. A method as in claim 1, wherein N is at least $2^{k+1}-1$ and said mapping comprises augmenting said k-bit information value with a 1.

6. A method as in claim 1, wherein said outputting comprising latching the contents of said circular shift register to an output.

7. A method as in claim 1, wherein said m-bit field comprises uniformly spaced bits from said circular shift register.

8. A method as in claim 1, wherein said m-bit field comprises contiguous bits from said circular shift register.

9. A method as in claim 1, wherein said circularly shifting and said comparing are repeated until a match is found between said m-bit field from said shifted m-sequence with said m-bit symbol.

10. A method for generating an N-chip modulation sequence corresponding to a k bit information value in a Code Position Modulation encoder, said method comprising:

mapping said k bit information value to an m-bit initial condition;

initializing pseudo-noise sequence generator with said initial condition; and clocking said pseudo-noise sequence generator N times to produce said N-chip modulation sequence as an output.

11. A method as in claim 10, wherein said pseudo-noise sequence generator is an linear feedback shift register.

12. A method as in claim 10, wherein said mapping comprises processing said k-bit information value in a combinational logic circuit.

13. A method as in claim 10, wherein said mapping comprises accessing a look-up table in accordance with said k-bit information value.

14. A method as in claim 10, further comprising augmenting said N-chip modulation sequence by including an additional chip at a sequence location determined by said k-bit information value.

15. A method as in claim 10, wherein N is at least $2^{k+1}-1$ and said mapping comprises augmenting said k-bit information value with a 1.

16. A method for decoding an N-chip modulation sequence in a Code Position Modulation decoder to recover a k-bit information value, said method comprising:

storing an N-chip m-sequence in a circular shift register;

fetching said N-chip modulation sequence;

circularly shifting said N-chip m-sequence by a plurality of shift values to obtain a plurality of shifted m-sequences;

correlating said N-chip modulation sequence with each of said plurality of shifted m-sequence to obtain a plurality of correlation values;

detecting a correlation point as the shift value of the plurality of shift values that produces a correlation value meeting a predetermined criteria;

outputting an m-bit field from said m-sequence circularly shifted to said correlation point; and mapping said m-bit field to a k-bit value, thereby recovering said k-bit information value.

17. A method as in claim 16, wherein said detecting a correlation point comprises determining the first shift value of the plurality of shift values for which the corresponding correlation value of the plurality of correlation values exceeds a predetermined threshold value.

18. A method as in claim 16, wherein said detecting a correlation point comprises determining the shift value of the plurality of shift values for which the corresponding correlation value of the plurality of correlation is at a maximum.

19. A method as in claim 16, wherein said mapping comprises processing said m-bit field value in a combinational logic circuit.

20. A method as in claim 16, wherein said mapping comprises accessing a look-up table in accordance with said m-bit field.

21. A method as in claim 16, further comprising augmenting said m-sequence by including an additional chip such that the sequence length is $N=2^m$.

22. A method as in claim 16, wherein N is at least $2^m-1$ and said mapping comprises selecting m−1 bits from said m-bit field.

23. An apparatus for generating an N-chip modulation sequence corresponding to a k bit information value in a Code Position Modulation encoder, said apparatus comprising:

an N-chip circular shift register for storing an N-chip m-sequence;

means for converting said k bit information value into a m-bit symbol;

a comparator having a first input coupled to said means for converting, a second input coupled to said circular shift register and a comparator output; and a modulation sequence output coupled to said circular shift register and to said comparator output and operable to output the contents of said circular shift register when said m-bits selected from said circular shift register match said m-bit symbol.

24. An apparatus as in claim 23, wherein said modulation sequence output comprises a latch.

25. An apparatus as in claim 23, wherein said means for converting said k bit information value into a m-bit symbol comprises a combinational logic circuit.

26. An apparatus as in claim 23, wherein said means for converting said k bit information value into an m-bit symbol comprises a memory for storing a look-up table.

27. An apparatus as in claim 23, wherein said m-sequence is augmented by including an additional chip such that the sequence length is $N=2^m$.

28. An apparatus as in claim 23, wherein said means for converting said k bit information value into a m-bit symbol comprises a means for augmenting said k-bit information value with a one.

29. An apparatus for generating an N-chip modulation sequence corresponding to a k bit information value in a Code Position Modulation encoder, said apparatus comprising:

a pseudo-noise sequence generator having a input and an output, said input operable to receive an initial condition;

a logic element for receiving said k bit information value as input and producing an m-bit initial condition as output, said logic element being coupled to said input for receiving an initial condition; and means for clocking said pseudo-noise sequence generator to generate said N-chip modulation sequence at the pseudo-random noise generator output.

30. An apparatus as in claim 29, wherein said pseudo-noise sequence generator comprises a linear feedback shift register.

31. An apparatus as in claim 29, wherein said logic element comprises a combinational logic circuit.

32. An apparatus as in claim 29, wherein said logic element comprises a memory for storing a look-up table.

33. An apparatus as in claim 29, wherein logic element is operable to augment said k-bit information value with a one.

34. An apparatus as in clam 29, wherein said linear feedback shift register comprises a plurality of registers and at least one modulo 2 adder.

35. An apparatus for decoding an N-chip input sequence to recover a corresponding k-bit information value in a Code Position Modulation decoder, said apparatus comprising:

an N-chip circular shift register for storing an N-chip m-sequence and producing a shifted m-sequence;

a correlator having a first input for receiving said N-chip input sequence, a second input coupled to said N-chip circular shift register for receiving said shifted m-sequence and an output for outputting a correlation value;

a peak detector coupled the output of said correlation and operable to detect a peak a correlation value meeting some predetermined criteria;

mapping means for converting an m-bit field into a k bit information value; and a latch coupled to said peak detector and operable to couple an m-bit field of the N-chip circular shift register to said mapping means.

36. An apparatus as in claim 35, wherein said mapping means comprises a combinational logic circuit.

37. An apparatus as in claim 35, wherein said mapping means comprises a memory operable to store a look-up table.

38. An apparatus as in claim 35, wherein said mapping comprises selecting k bits from said m-bit field.

39. An apparatus as in claim 35, wherein said m-sequence is augmented by including an additional chip such that the sequence length is $N=2^m$.

* * * * *